(12) United States Patent
Loh

(10) Patent No.: US 12,373,905 B2
(45) Date of Patent: Jul. 29, 2025

(54) METHOD OF RECOMMENDING PRECEDING EDUCATIONAL CONTENT AND EDUCATIONAL CONTENT RECOMMENDATION DEVICE FOR RECOMMENDING PRECEDING EDUCATIONAL CONTENT

(71) Applicant: RIIID INC., Seoul (KR)

(72) Inventor: Hyun Bin Loh, Seoul (KR)

(73) Assignee: RIIID INC., Seoul (KR)

( * ) Notice: Subject to any disclaimer, the term of this patent is extended or adjusted under 35 U.S.C. 154(b) by 346 days.

(21) Appl. No.: 17/982,648

(22) Filed: Nov. 8, 2022

(65) Prior Publication Data

US 2023/0144716 A1 May 11, 2023

(30) Foreign Application Priority Data

Nov. 8, 2021 (KR) ........................ 10-2021-0152036

(51) Int. Cl.
 *G06Q 50/20* (2012.01)
 *G06F 40/40* (2020.01)
(52) U.S. Cl.
 CPC ........... *G06Q 50/205* (2013.01); *G06F 40/40* (2020.01)
(58) Field of Classification Search
 CPC .. G06Q 50/205; G06Q 50/2057; G06F 40/40; G06F 40/30; G06F 16/901; G06F 16/9035; G06F 16/9038; G06F 16/906; G06F 30/27; G06N 3/044; G06N 3/045; G06N 7/01; G06N 3/08; G06N 20/00
 See application file for complete search history.

(56) References Cited

U.S. PATENT DOCUMENTS

| | | | |
|---|---|---|---|
| 11,172,040 B2 * | 11/2021 | Zhang | ..................... H04L 67/02 |
| 2017/0091313 A1 * | 3/2017 | Chalabi | ................. G06F 16/958 |

FOREIGN PATENT DOCUMENTS

| | | | |
|---|---|---|---|
| CN | 105243120 A | * | 1/2016 |
| KR | 10-2019-0050537 A | | 5/2019 |
| KR | 10-2266310 B1 | | 6/2021 |

OTHER PUBLICATIONS

Korean Office Action dated Oct. 4, 2023 in Korean Application No. 10-2021-0152036.
BERT "Pre-training of Deep Bidirectional Trnasformers for Language Understanding", Google BERT, Feb. 12, 2020 (11 pages total).

* cited by examiner

*Primary Examiner* — Linda Wong
(74) *Attorney, Agent, or Firm* — Sughrue Mion, PLLC

(57) ABSTRACT

Provided are a method of recommending preceding educational content and an educational content recommendation device for recommending preceding educational content. The method includes acquiring a language model of which training has been completed, updating the language model by tuning the language model to acquire a target language model, and determining preceding educational content through the target language model. The acquirement of the target language model includes acquiring an educational data set including first clustering data and second clustering data and updating the language model to predict a probability that the first clustering data is a next token of the second clustering data.

8 Claims, 7 Drawing Sheets

METHOD OF RECOMMENDING PRECEDING EDUCATIONAL CONTENT AND EDUCATIONAL CONTENT RECOMMENDATION DEVICE FOR RECOMMENDING PRECEDING EDUCATIONAL CONTENT

CROSS-REFERENCE TO RELATED APPLICATION

This application claims priority to and the benefit of Korean Patent Application No. 2021-0152036, filed on Nov. 8, 2021, the disclosure of which is incorporated herein by reference in its entirety.

BACKGROUND

1. Field of the Invention

The present invention relates to a method, device, and system for recommending educational content. Specifically, the present invention relates to an educational content recommendation method, device, and system for determining preceding educational content which is to be learned in advance so as to learn target educational content.

2. Discussion of Related Art

With the development of artificial intelligence technology, an educational technology for diagnosing a learner's ability and recommending educational content on the basis of the diagnosis result is attracting attention. In particular, there is an increasing demand for a preceding educational content recommendation technology for efficiently improving a learner's ability by providing preceding educational content that the learner should learn to answer a specific question or understand specific educational content.

According to the related art, text included in target educational content is analyzed, and educational content is recommended on the basis of a keyword included in the text, or an expert manually tags target educational content with preceding educational content. However, the keyword-based educational content recommendation method only provides a user with content that is highly related to target educational content and fails to provide preceding educational content that should be essentially learned to understand or solve target educational content. Also, the manual tagging method of an expert has a limitation in that it takes considerable time and cost.

Therefore, it is necessary to develop a new educational content recommendation method, device, and system for recommending preceding educational content for target educational content to a learner.

SUMMARY OF THE INVENTION

The present invention is directed to providing an educational content recommendation method, device, and system for determining preceding educational content that is required to be learned to understand or solve target educational content.

Objects of the present invention are not limited to those described above, and other objects which have not been described above will be clearly understood by those of ordinary skill in the art from the specification and the accompanying drawings.

According to an aspect of the present invention, there is provided a method of recommending preceding educational content, the method including acquiring a language model of which training has been completed, updating the language model by tuning the language model to acquire a target language model, and determining preceding educational content through the target language model. The acquirement of the target language model includes acquiring an educational data set including first clustering data and second clustering data and updating the language model to predict a probability that the first clustering data is a next token of the second clustering data.

According to another aspect of the present invention, there is provided a device for recommending preceding educational content, the device including a transceiver configured to communicate with a user terminal and a controller configured to acquire target educational content through the transceiver and determine preceding educational content required for solving the target educational content. The controller acquires a language model of which training has been completed, updates the language model by tuning the language model to acquire a target language model, and determines preceding educational content through the target language model. The controller acquires an educational data set including first clustering data and second clustering data and acquires the target language model by updating the language model to predict a probability that the first clustering data is a next token of the second clustering data.

Solutions to the objects of the present invention are not limited to those described above, and other solutions which have not been described above will be clearly understood by those of ordinary skill in the art from the specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
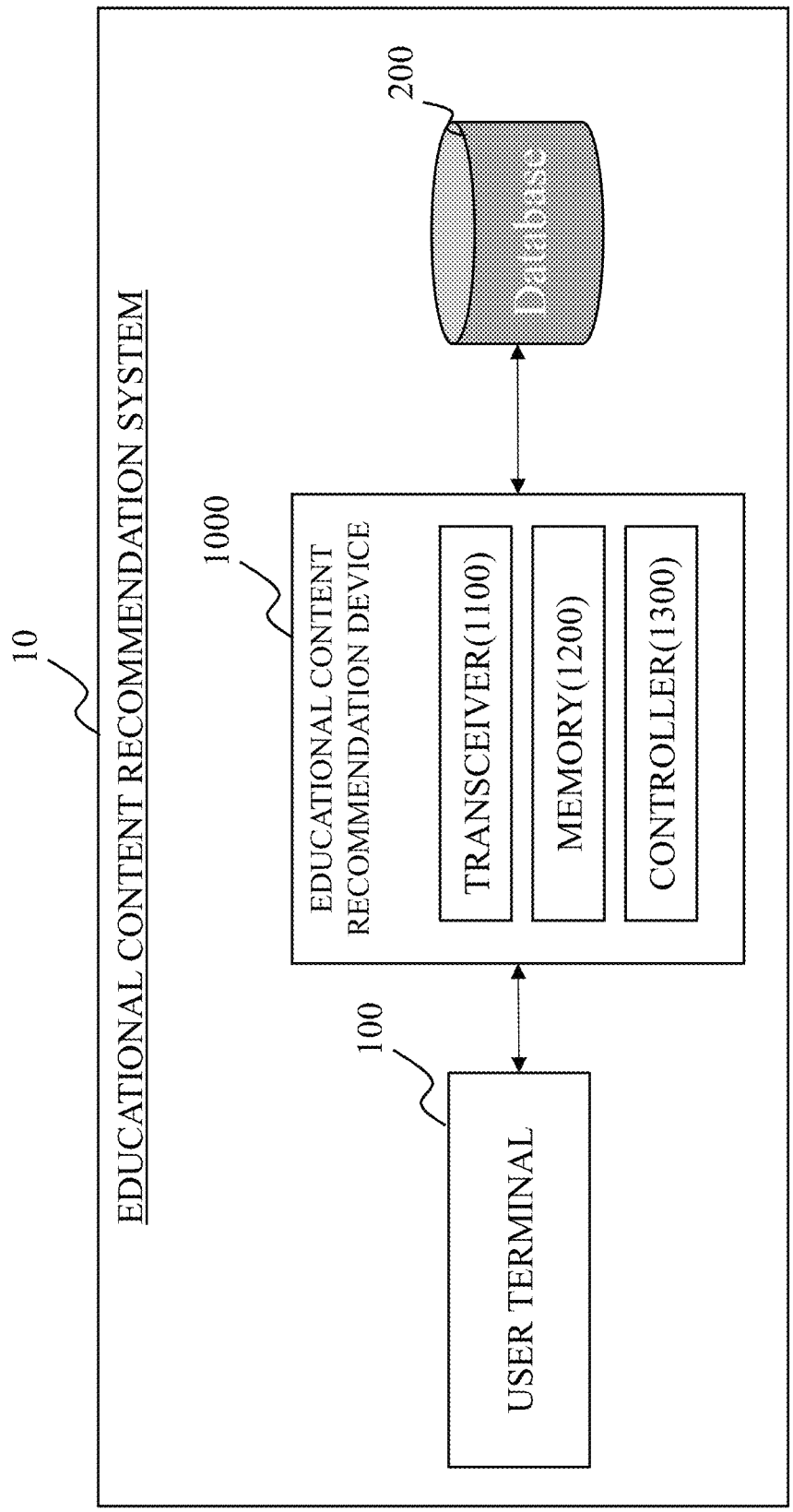
FIG. 1 is a block diagram schematically illustrating an educational content recommendation system according to an exemplary embodiment of the present invention.

The above-described objects, features, and advantages of the present invention will be apparent through the following detailed description related to the accompanying drawings. Since the present invention can be modified in various ways and have various embodiments, specific embodiments will be illustrated in the drawings and described in detail.

Throughout the specification, like reference numerals basically refer to like elements. Elements having the same function within the scope of the same idea shown in the drawings of each embodiment will be described using the same reference numerals, and overlapping descriptions thereof will be omitted.

When it is determined that a detailed description of a known function or element related to the present invention may unnecessarily obscure the subject matter of the present invention, the detailed description will be omitted. Also, numerals (e.g., first and second) used in the description of the specification are merely identifiers for distinguishing one element from another.

The suffixes "module" and "unit" for elements used in the following embodiments are given or interchangeably used in consideration of only the ease of drafting the specification and do not have a meaning or role distinct from each other.

In the following embodiments, the singular forms are intended to include the plural forms as well unless the context clearly indicates otherwise.

The terms "comprises," "comprising," "includes," "including," "has," "having," etc. mean the presence of features or elements stated herein and do not preclude the possibility of adding one or more other features or elements.

In the drawings, the sizes of elements may be exaggerated or reduced for the convenience of description. For example, the size and thickness of each element shown in the drawings are arbitrarily shown for the convenience of description, and thus the present invention is not necessarily limited to those shown in the drawings.

When a certain embodiment can be implemented differently, a specific process may be performed in a different order than that described. For example, two processes described in succession may be performed substantially simultaneously or performed in a reverse order of that described.

In the following embodiments, when elements and the like are referred to as being connected, the elements may be directly connected or indirectly connected with elements interposed therebetween.

For example, when elements and the like are referred to as being electrically connected herein, the elements and the like may be directly and electrically connected or may be indirectly and electrically connected with an element and the like interposed therebetween.

A method of recommending preceding educational content according to an exemplary embodiment of the present invention may include an operation of acquiring a language model of which training has been completed, an operation of updating the language model by tuning the language model to acquire a target language model, and an operation of determining preceding educational content through the target language model. The operation of acquiring the target language model may include an operation of acquiring an educational data set including first clustering data and second clustering data and an operation of updating the language model to predict a probability that the first clustering data is a next token of the second clustering data.

According to an exemplary embodiment of the present invention, the operation of determining the preceding educational content may include an operation of acquiring target educational content, an operation of acquiring an educational content database including one or more pieces of candidate educational content, an operation of calculating probabilities that the target educational content is a next token of the one or more pieces of candidate educational content included in the educational content database through the target language model, and an operation of determining the preceding educational content among the one or more pieces of candidate educational content included in the educational content database on the basis of the calculated probabilities.

According to an exemplary embodiment of the present invention, the educational content database may include first candidate educational content and second candidate educational content, and the operation of calculating the probabilities that the target educational content is the next token may include an operation of calculating a first probability that the target educational content is a next token of the first candidate educational content and an operation of calculating a second probability that the target educational content is a next token of the second candidate educational content.

According to an exemplary embodiment of the present invention, the operation of determining the preceding educational content may further include an operation of comparing the first probability with the second probability and an operation of selecting the candidate educational content having a larger probability value as the preceding educational content according to a result of the comparison.

According to an exemplary embodiment of the present invention, the target educational content may be educational content related to a question, and the candidate educational content may be educational content related to a concept or a formula required for solving the target educational content.

According to an exemplary embodiment of the present invention, the first clustering data or the second clustering data may be manually labelled.

According to an exemplary embodiment of the present invention, the language model may be a model related to at least one of bidirectional encoder representations from transformers (BERT) and generative pretrained transformer (GPT).

An exemplary embodiment of the present invention may provide a computer-readable recording medium on which a program for performing the method of recommending preceding educational content is recorded.

A device for recommending educational content according to an exemplary embodiment of the present invention may include a transceiver configured to communicate with a user terminal and a controller configured to acquire target educational content through the transceiver and determine preceding educational content required for solving the target educational content. The controller may acquire a language model of which training has been completed, update the language model by tuning the language model to acquire a target language model, and determine preceding educational content through the target language model. The controller may acquire an educational data set including first clustering data and second clustering data and acquire the target language model by updating the language model to predict a probability that the first clustering data is a next token of the second clustering data.

Hereinafter, an educational content recommendation method, device, and system according to exemplary embodiments of the present invention will be described with reference to FIGS. 1 to 7.

FIG. 1 is a block diagram schematically illustrating an educational content recommendation system 10 according to an exemplary embodiment of the present invention. The educational content recommendation system 10 according to the exemplary embodiment of the present invention may include a user terminal 100, a database 200, and an educational content recommendation device 1000.

The user terminal 100 may capture educational content (e.g., questions and text) and transmit an image related to the captured educational content to the educational content recommendation device 1000. Alternatively, the user terminal 100 may acquire educational content in a video form and transmit the educational content to the educational content recommendation device 1000.

Also, the user terminal 100 may receive preceding educational content, which is to be learned in advance so as to learn educational content, from the educational content recommendation device 1000. As an example, the user terminal 100 may receive preceding educational content (e.g., a formula or a concept related to a question), which is to be learned in advance so as to answer educational content (e.g., a question), from the educational content recommendation device 1000. As another example, the user terminal 100 may receive video lecture content related to preceding educational content (e.g., a formula or a concept related to a question), which is to be learned in advance so as to answer educational content (e.g., the question), from the educational content recommendation device 1000.

The database 200 according to the exemplary embodiment of the present invention may store various pieces of data of the educational content recommendation system 10.

Specifically, the database 200 may include various pieces of educational content data. As an example, the database 200 may include textbook data about any subject (e.g., Korean, English, and mathematics) depending on any grade (or level). The textbook data may be any data related to a textbook. For example, the textbook data may encompass data related to text, figures, tables, graphs, etc. included in a textbook and any data processed on the basis of the data related to the text, the figures, the tables, the graphs, etc. included in the textbook. Also, the textbook data may include first clustering data and second clustering data. For example, the textbook data may include first clustering data corresponding to any question (e.g., which may include text, a figure, a graph, and/or a table) and second clustering data corresponding to a concept or a formula (e.g., which may include text, a figure, a graph, and/or a table) required for answering the question.

As another example, the database 200 may include an educational content database including any educational content related to various questions, various concepts, various formulae, etc. The educational content included in the educational content database may be used in selecting preceding educational content as will be described below.

The educational content recommendation device 1000 according to the exemplary embodiment of the present invention may perform an operation of acquiring target educational content and an operation of determining preceding educational content to be learned in advance so as to learn the target educational content.

The educational content recommendation device 1000 according to the exemplary embodiment of the present invention may include a transceiver 1100, a memory 1200, and a controller 1300.

The transceiver 1100 may communicate with any external device including the user terminal 100. For example, the educational content recommendation device 1000 may receive the target educational content as a reference for selecting preceding educational content from the user terminal 100 through the transceiver 1100 or transmit preceding educational content, which is determined on the basis of the target educational content, to the user terminal 100 through the transceiver 1100. Alternatively, the educational content recommendation device 1000 may receive execution data for executing a language model of which training has been completed and/or execution data for executing a language model from any external device through the transceiver 1100.

The educational content recommendation device 1000 may access a network through the transceiver 1100 to transmit and receive various pieces of data. The transceiver 1100 may be a wired type or a wireless type. Since each of the wired type and the wireless type has advantages and disadvantages, both the wired type and the wireless type may be provided in the educational content recommendation device 1000 in some cases. The wireless type may employ a wireless local area network (WLAN)-based communication method such as Wi-Fi. Alternatively, the wireless type may employ cellular communication, for example, Long Term Evolution (LTE) or fifth generation (5G) communication. However, a wireless communication protocol is not limited to the above-described examples, and any appropriate wireless communication method may be used. The wired type representatively employs, for example, LAN or universal serial bus (USB) communication and may also employ other communication methods.

The memory 1200 may store various pieces of information. In the memory 1200, various pieces of data may be temporarily or semi-permanently stored. Examples of the memory 1200 include a hard disk drive (HDD), a solid state drive (SSD), a flash memory, a read-only memory (ROM), a random access memory (RAM), etc. The memory 1200 may be provided in a form that is embedded in or detachable from the educational content recommendation device 1000. The memory 1200 may store an operating system (OS) for running the educational content recommendation device 1000, a program for operating each element of the educational content recommendation device 1000, and various pieces of data required for operations of the educational content recommendation device 1000.

The controller 1300 may control the overall operation of the educational content recommendation device 1000. For example, the controller 1300 may control an operation of acquiring a target language model by tuning a language model of which training has been completed, an operation of determining preceding educational content through the target language model, etc., which will be described below. Specifically, the controller 1300 may load a program for the overall operation of the educational content recommendation device 1000 from the memory 1200 and run the program. The controller 1300 may be implemented as an application processor (AP), a central processing unit (CPU), or a similar device on the basis of hardware, software, or a combination of hardware and software. As hardware, the controller 1300 may be provided in the form of an electronic circuit for processing an electrical signal to perform a control function. As software, the controller 1300 may be provided in the form of a program or code for operating a hardware circuit.

Figure 2:
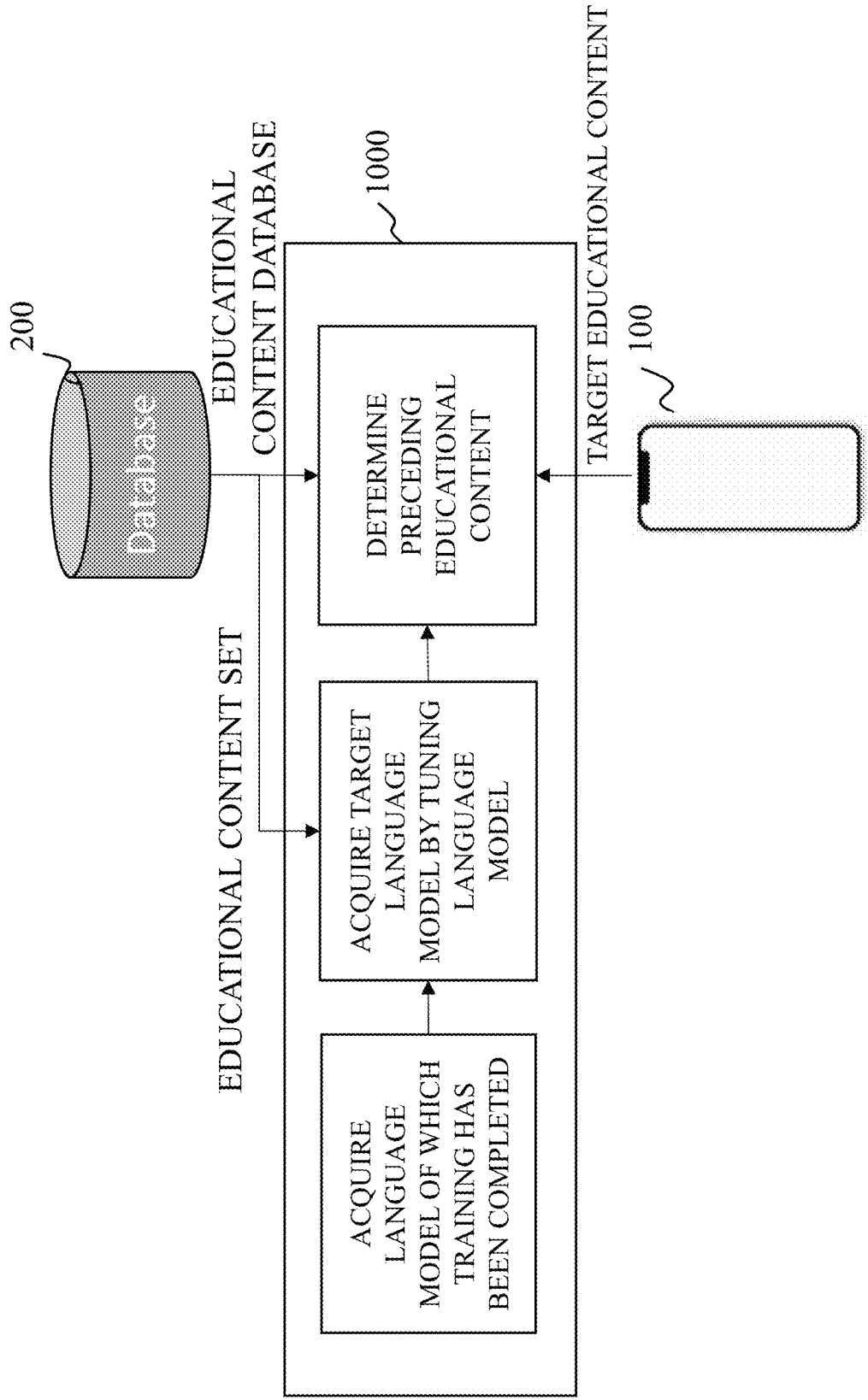
FIG. 2 is a diagram illustrating operations of an educational content recommendation device according to an exemplary embodiment of the present invention.

Operations of the educational content recommendation device 1000 of the educational content recommendation system 10 for achieving the above-described objects and effect according to the exemplary embodiment of the present invention will be described in detail below with reference to FIG. 2. FIG. 2 is a diagram illustrating operations of the educational content recommendation device 1000 according to the exemplary embodiment of the present invention.

The educational content recommendation device 1000 according to the exemplary embodiment of the present invention may acquire a language model of which training has been completed and/or any execution data for executing the language model. The language model may indicate any model that allocates a probability to a word sequence (or sentence) so as to model a phenomenon called language. For example, the language model may be a model related to at least one of BERT and GPT. Specifically, the language model may be a model that is trained with any text to predict a next word (or a next sentence) when a specific word (or a specific sentence) is given.

The educational content recommendation device 1000 according to the exemplary embodiment of the present invention may acquire a target language model by tuning the language model. Specifically, the educational content recommendation device 1000 may acquire an educational content set (e.g., textbook data) and acquire the target language model by tuning the language model on the basis of the educational content set.

Specifically, the educational content recommendation device 1000 may acquire the educational content set from the database 200. The educational content set (e.g., textbook data) may include first clustering data and second clustering data. For example, the educational content set (e.g., textbook data) may include first clustering data corresponding to any question (e.g., which may include text, a figure, a graph, and/or a table) and second clustering data corresponding to a concept or a formula (e.g., which may include text, a figure, a graph, and/or a table) required for answering the question. The first clustering data and/or the second clustering data may be manually defined or tagged by an expert. Alternatively, the first clustering data and/or the second clustering data may be automatically tagged through any natural language analysis technique.

Also, the educational content recommendation device 1000 may tune or update the language model using the educational content set including the first clustering data and the second clustering data. Specifically, the educational content recommendation device 1000 may tune the language model with the educational content set to predict a probability that any first clustering data included in the educational content set is a next token of any second clustering data and acquire the target language model of which tuning has been completed. The educational content recommendation device 1000 may tune the language model using a next-token prediction algorithm which is a natural language processing technique.

The educational content recommendation device 1000 according to the exemplary embodiment of the present invention may determine preceding educational content using the target language model.

The educational content recommendation device 1000 may acquire the target language content as a reference for determining recommended content. Specifically, the educational content recommendation device 1000 may acquire any data, which includes an image of target educational content (e.g., a question) and is related to the target educational content, from the user terminal 100.

Also, the educational content recommendation device 1000 may acquire an educational content database including various pieces of educational content. For example, the educational content recommendation device 1000 may acquire an educational content database including a plurality of pieces of candidate educational content including first candidate educational content and second candidate educational content.

The educational content recommendation device 1000 according to the exemplary embodiment of the present invention may calculate a probability that the target educational content is a next token of candidate educational content included in the educational content database using the target language model. For example, the educational content recommendation device 1000 may calculate a first probability that the target educational content is a next token of the first candidate educational content using the target language model. Also, the educational content recommendation device 1000 may calculate a second probability that the target educational content is a nest token of the second candidate educational content using the target language model.

The educational content recommendation device 1000 according to the exemplary embodiment of the present invention may perform an operation of determining preceding educational content among a plurality of pieces of candidate educational content included in the educational content database on the basis of the calculated probabilities. For example, the educational content recommendation device 1000 may compare the first probability that the target educational content is the next token of the first candidate educational content with the second probability that the target educational content is the next token of the second candidate educational content and select at least one of the first candidate educational content and the second candidate educational content as preceding educational content according to the comparison result. More specifically, the educational content recommendation device 1000 may compare the first probability with the second probability and select the candidate educational content having a larger probability value as preceding educational content.

A method of recommending educational content according to an exemplary embodiment of the present invention will be described in detail below with reference to FIGS. 3 to 7. In describing the method of recommending educational content, some embodiments overlapping with the above descriptions of operations of the educational content recommendation device 1000 may be omitted. However, this is only for the convenience of description and should not be construed as limiting.

Figure 3:
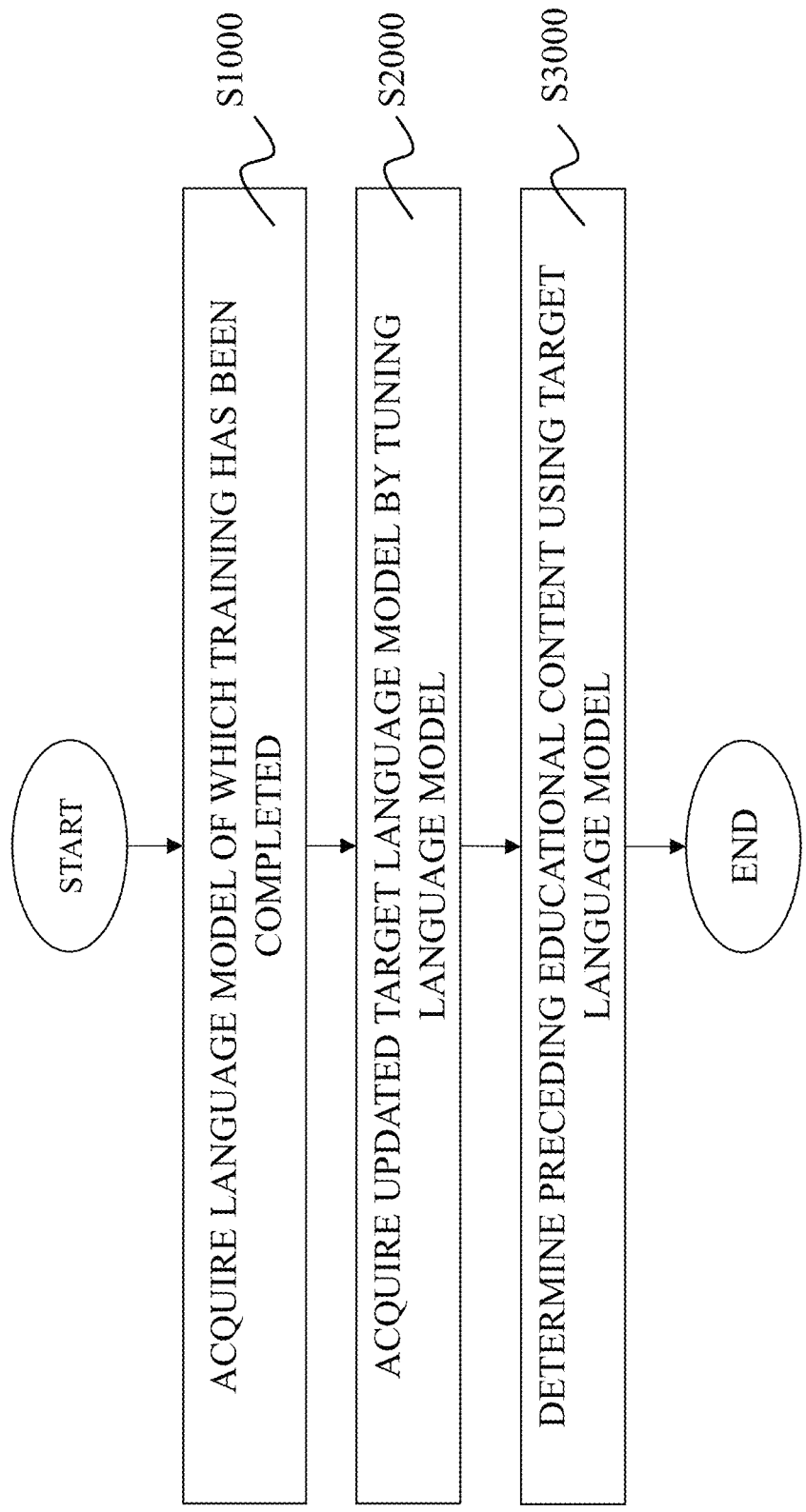
FIG. 3 is a flowchart illustrating a method of recommending educational content according to an exemplary embodiment of the present invention.

FIG. 3 is a flowchart illustrating a method of recommending educational content according to an exemplary embodiment of the present invention.

The method of recommending educational content according to the exemplary embodiment of the present invention may include an operation S1000 of acquiring a language model of which training has been completed, an operation S2000 of acquiring a target language model updated by tuning the language model, and an operation S3000 of determining preceding educational content through the target language model.

In the operation S1000 of acquiring a language model of which training has been completed, the educational content recommendation device 1000 may acquire a language model of which training has been completed and/or any execution data for executing a language model. As described above, the language model may indicate any model that allocates a probability to a word sequence (or sentence) so as to model a phenomenon called language. For example, the language model may be a model related to at least one of BERT and GPT. Specifically, the language model may be a model that is trained with any text to predict a next word when a specific word (or a specific sentence) is given.

In the operation S2000 of acquiring a target language model updated by tuning the language model, the educational content recommendation device 1000 may acquire a target language model by tuning the language model. Specifically, the educational content recommendation device 1000 may acquire an educational content set (e.g., textbook data) and acquire the target language model by tuning the language model using a plurality of pieces of clustering data included in the educational content set.

Figure 4:
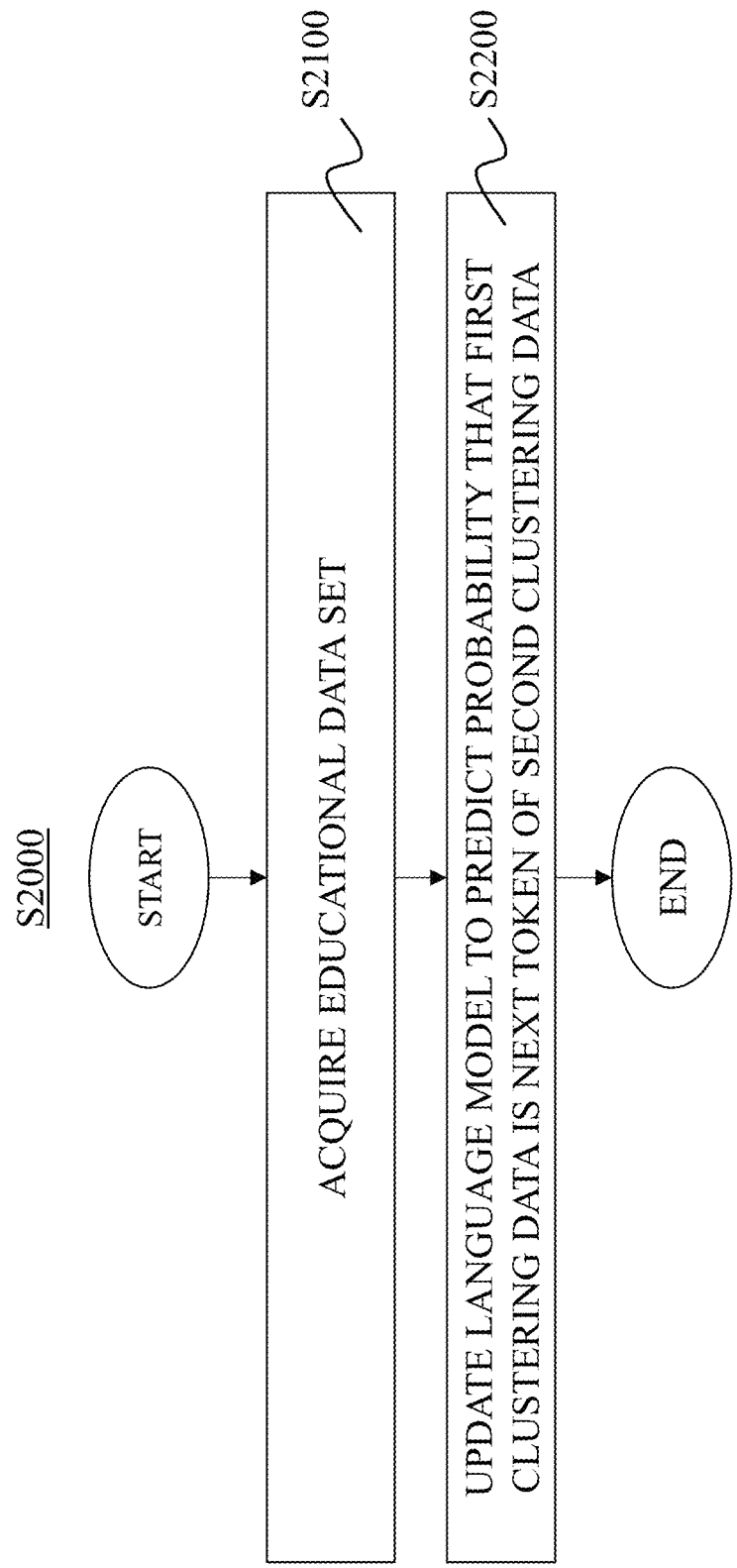
FIG. 4 is a detailed flowchart illustrating a method of acquiring a target language model according to the exemplary embodiment of the present invention.
Figure 5:
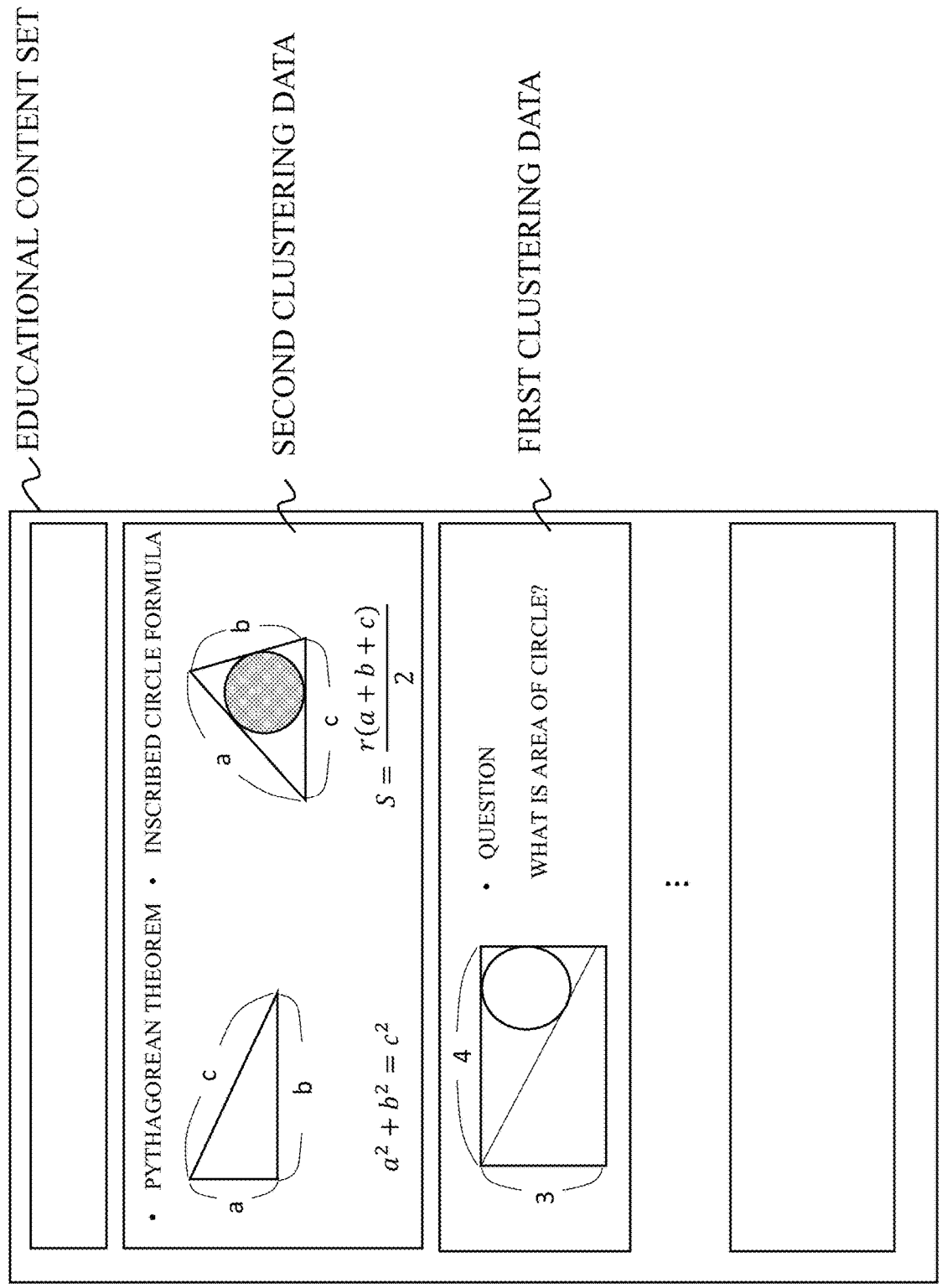
FIG. 5 is a diagram illustrating an aspect of tuning a language model according to an exemplary embodiment of the present invention.

The operation S2000 of acquiring a target language model will be described in more detail below with reference to FIGS. 4 and 5. FIG. 4 is a detailed flowchart illustrating a method of acquiring a target language model according to the exemplary embodiment of the present invention. FIG. 5 is a diagram illustrating an aspect of tuning a language model according to an exemplary embodiment of the present invention.

The operation S2000 of acquiring a target language model updated by tuning the language model may include an operation S2100 of acquiring an educational data set and an operation S2200 of updating the language model to predict a probability that first clustering data is a next token of second clustering data.

In the operation S2100 of acquiring an educational data set, the educational content recommendation device 1000 may acquire an educational data set from the database 200. The educational content set (e.g., textbook data) may include first clustering data and second clustering data. For example, the educational content set (e.g., textbook data) may include first clustering data corresponding to any question and second clustering data corresponding to a concept or a formula (e.g., the Pythagorean theorem or an inscribed circle formula) required for answering the question. The first clustering data and/or the second clustering data may be manually defined or tagged by an expert. Alternatively, the first clustering data and/or the second clustering data may be automatically tagged through any natural language analysis technique.

In the operation S2200 of updating the language model to predict a probability that first clustering data is a next token of second clustering data, the educational content recommendation device 1000 may tune or update the language model using the educational content set including the first clustering data and the second clustering data. Specifically, the educational content recommendation device 1000 may tune the language model with the educational content set to predict a probability that the first clustering data is the next token of the second clustering data. The educational content recommendation device 1000 may tune the language model using a next-token prediction algorithm which is a natural language processing technique.

Also, the educational content recommendation device 1000 may acquire a target language model of which tuning (or an update) has been completed.

Referring back to FIG. 3, the method of recommending educational content according to the exemplary embodiment of the present invention may include the operation S3000 of determining preceding educational content through the target language model.

In the operation S3000 of determining preceding educational content through the target language model, the educational content recommendation device 1000 may determine preceding educational content using the target language model. Specifically, the educational content recommendation device 1000 may acquire an educational content database including a plurality of pieces of candidate educational content and target educational content, calculate probabilities that the target educational content is a next token of the plurality of pieces of candidate educational content using the target language model, and determine preceding educational content among the plurality of pieces of candidate educational content included in the educational content database on the basis of the calculated probabilities.

Figure 6:
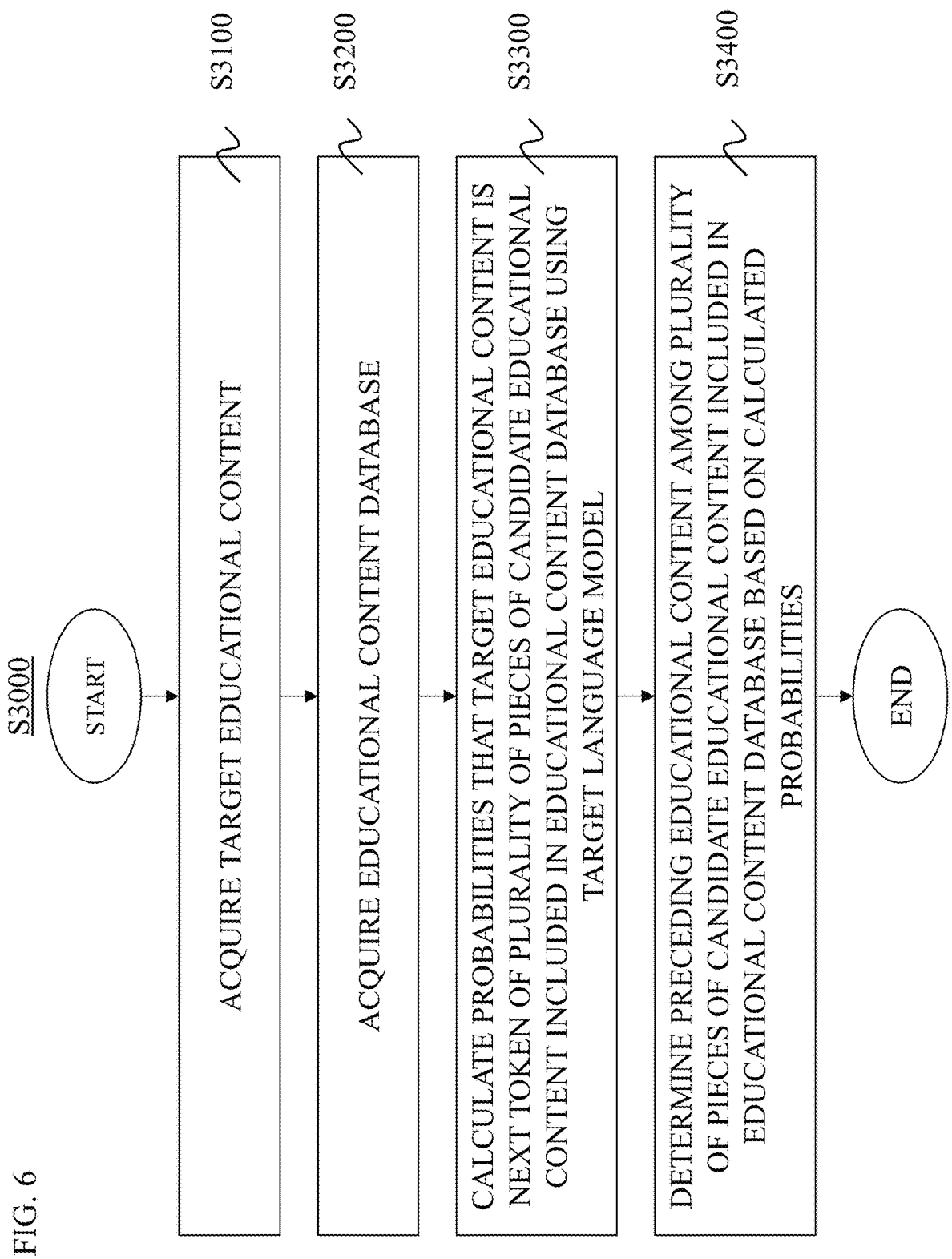
FIG. 6 is a detailed flowchart illustrating an operation of determining preceding educational content according to an exemplary embodiment of the present invention.
Figure 7:
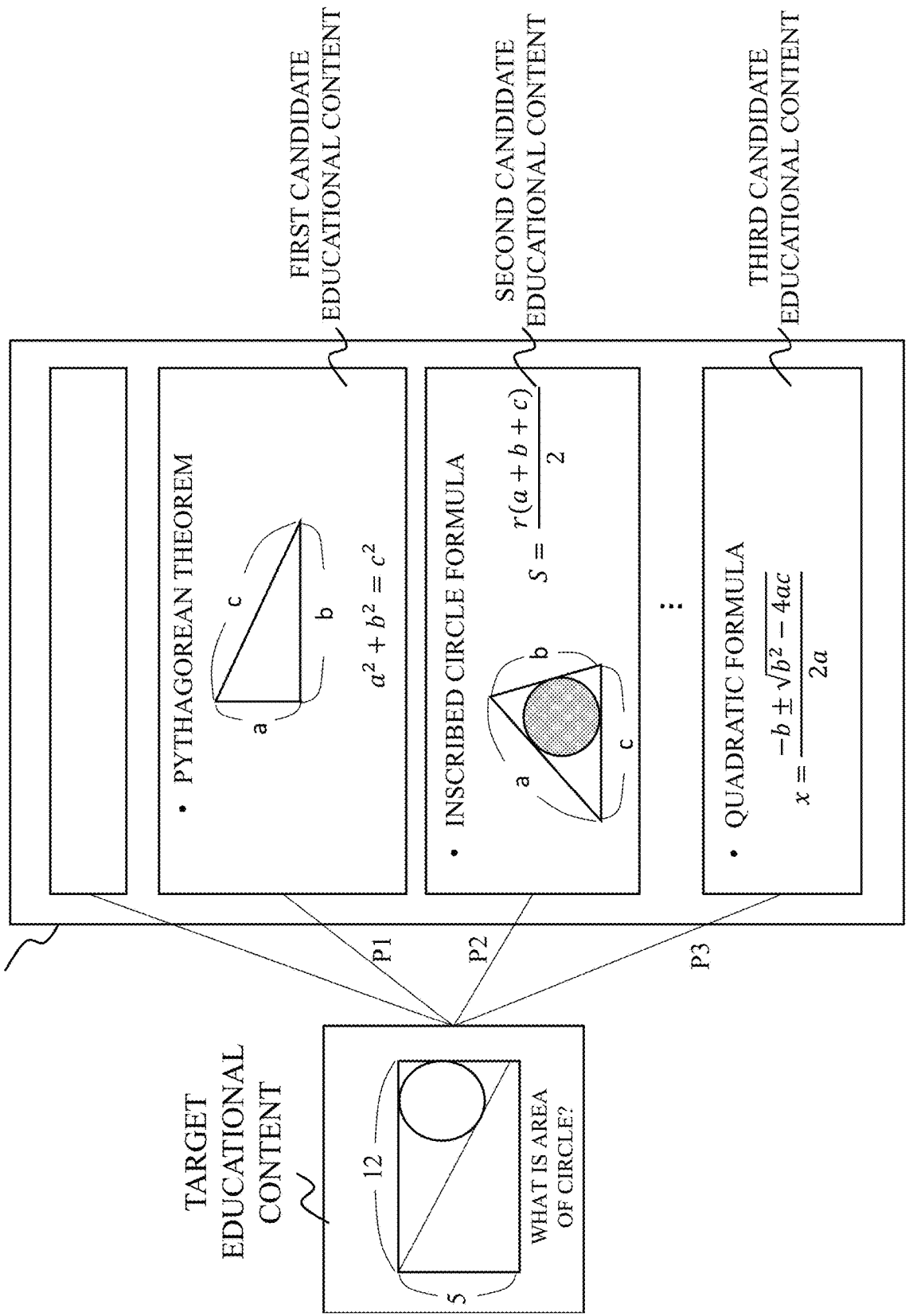
FIG. 7 is a diagram illustrating an aspect of determining preceding educational content according to an exemplary embodiment of the present invention.

A method of recommending preceding educational content according to the exemplary embodiment of the present invention will be described in more detail below with reference to FIGS. 6 and 7. FIG. 6 is a detailed flowchart illustrating the operation S3000 of determining preceding educational content according to the exemplary embodiment of the present invention. FIG. 7 is a diagram illustrating an aspect of determining preceding educational content according to an exemplary embodiment of the present invention.

The operation S3000 of determining preceding educational content according to the exemplary embodiment of the present invention may include an operation S3100 of acquiring target educational content, an operation S3200 acquiring an educational content database, an operation S3300 of calculating probabilities that the target educational content is a next token of the plurality of pieces of candidate educational content included in the educational content database through the target language model, and an operation S3400 of determining preceding educational content among the plurality of pieces of candidate educational content included in the educational content database on the basis of the calculated probabilities.

In the operation S3100 of acquiring target educational content, the educational content recommendation device 1000 may acquire target educational content. For example, the educational content recommendation device 1000 may acquire any data, which includes an image of the target educational content (e.g., a question), related to the target educational content through the user terminal 100. In this case, the educational content recommendation device 1000 may recognize information of the target educational content (e.g., chapter information related to the target educational content) by analyzing the image or text related to the target educational content.

In the operation S3200 of acquiring an educational content database, the educational content recommendation device 1000 may acquire an educational content database including various pieces of educational content (e.g., question content, formula content, and concept content) from the database 200. For example, the educational content database may acquire an educational content database which includes a plurality of pieces of candidate educational content including first candidate educational content and second candidate educational content.

In the operation S3300 of calculating probabilities that the target educational content is a next token of the plurality of pieces of candidate educational content included in the educational content database through the target language model, the educational content recommendation device 1000 may calculate probabilities that the target educational content is a next token of the plurality of pieces of candidate educational content included in the educational content database through the target language model. For example, to answer target educational content for calculating the area of an inscribed circle of FIG. 7, a learner is required to learn the Pythagorean theorem and/or the inscribed circle formula. As described above, the target language model according to the exemplary embodiment of the present invention has been trained to calculate a probability that any first clustering data included in an educational content set is a next token of any second clustering data. Accordingly, the educational content recommendation device 1000 according to the exemplary embodiment of the present invention may calculate probabilities that the target educational content is a next token of the plurality of pieces of candidate educational content included in the educational content database.

Specifically, the educational content recommendation device 1000 may calculate probabilities that the target educational content is a next token of the plurality of pieces of candidate educational content included in the educational content database using the target language model which has been tuned to predict a next token. For example, the educational content recommendation device 1000 may calculate a first probability that the target educational content (e.g., a question for calculating the area of an inscribed circle) is a next token of the first candidate educational content (e.g., the Pythagorean theorem) using the target language model. Also, the educational content recommendation device 1000 may calculate a second probability that the target educational content (e.g., the question for calculating the area of an inscribed circle) is a next token of the second candidate educational content (e.g., the inscribed circle formula) using the target language model. Further, the educational content recommendation device 1000 may calculate a third probability that the target educational content (e.g., the question for calculating the area of an inscribed circle) is a next token of third candidate educational content (e.g., other formula content or other concept content including the quadratic formula and the like) using the target language model.

In the operation S3400 of determining preceding educational content among the plurality of pieces of candidate educational content included in the educational content database on the basis of the calculated probabilities, the educational content recommendation device 1000 may determine that at least one of the plurality of pieces of candidate educational content included in the educational content database is preceding educational content on the basis of the calculated probabilities.

As an example, the educational content recommendation device 1000 may compare the first probability that the target educational content (e.g., the question for calculating the area of an inscribed circle) is a next token of the first candidate educational content (e.g., the Pythagorean theorem) with the third probability that the target educational content (e.g., the question for calculating the area of an inscribed circle) is a next token of the third candidate educational content (e.g., the quadratic formula) and may determine that at least one of the first candidate educational content and the third candidate educational content (e.g., the first candidate educational content related to the Pythagorean theorem) is preceding educational content on the basis of the comparison result. Specifically, the educational content recommendation device 1000 may compare the first probability with the third probability and determine that the candidate educational content having a larger probability value is preceding educational content.

As another example, the educational content recommendation device 1000 may compare the second probability that the target educational content (e.g., the question for calculating the area of an inscribed circle) is a next token of the second candidate educational content (e.g., the inscribed circle formula) with the third probability that the target educational content (e.g., the question for calculating the area of an inscribed circle) is a next token of the third candidate educational content (e.g., the quadratic formula) and may determine that at least one of the second candidate educational content and the third candidate educational content (e.g., the second candidate educational content related to the inscribed circle formula) is preceding educational content on the basis of the comparison result. Specifically, the educational content recommendation device 1000 may compare the second probability with the third probability and determine that the candidate educational content having a larger probability value is preceding educational content.

A process of calculating a probability that target educational content is a next token of each piece of candidate educational content and comparing the probabilities with each other to determine preceding educational content has been mainly described above. However, this is merely exemplary, and any appropriate method may be used to determine some of a plurality of pieces of candidate educational content as preceding educational content. For example, the educational content recommendation device 1000 may acquire preceding educational content for target educational content using any method such as calculating a probability that target educational content is a next token of each piece of candidate educational content, giving a rank to each piece of the candidate educational content on the basis of the calculated probabilities, and selecting preceding educational content on the basis of the given ranks.

A process of determining preceding educational content has been described above on the basis of an example in which target educational content is a "question." However, this is merely exemplary for the convenience of description, and the process may also be applied to a case in which target educational content is any concept or any formula. For example, even when target educational content is any concept or any formula, the educational content recommendation device 1000 may calculate a probability that the target educational content is a next token of candidate educational content included in an educational content database using a target language model and select preceding educational content (e.g., any educational content to be learned in advance so as to understand a concept or a formula) on the basis of the calculated probability.

It has been described above that a target language model is acquired by tuning a language model of which training has been completed. However, this is merely exemplary, and a target language model may be acquired by training a target model with an educational content set, which includes a plurality of pieces of clustering data, to predict a next token.

Educational content in a text form has been mainly described above. However, this is merely exemplary for the convenience of description. For example, the educational content recommendation device 1000 may train a model for calculating a probability that any data related to a video of a first time point is a next token of any data related to a video of a second time point using a record of watching a video lecture, a record of answering a question, a record of reading text, etc. and determine that a video lecture of any time point required for learning target educational content is preceding educational content using the model of which training has been completed.

The educational content recommendation system 10 according to the exemplary embodiment of the present invention can provide a user with preceding educational content required for learning or understanding target educational content. In this case, the educational content recommendation system 10 according to the exemplary embodiment of the present invention can have a beneficial effect in that it is possible to rapidly and accurately calculate preceding educational content for target educational content by automatically calculating a probability that the target educational content is a next token of any candidate educational content through a next-token prediction algorithm.

The above-described various operations of the educational content recommendation device 1000 may be stored in the memory 1200 of the educational content recommendation device 1000, and the controller 1300 of the educational content recommendation device 1000 may perform the operations stored in the memory 1200.

With the educational content recommendation method, device, and system according to the exemplary embodiments of the present invention, it is possible to provide a user with preceding educational content required for learning or understanding target educational content.

With the educational content recommendation method, device, and system according to the exemplary embodiments of the present invention, the probability that target educational content is a next token of any candidate educational content can be automatically calculated through a next-token prediction algorithm, and thus it is possible to rapidly and accurately select preceding educational content for target educational content.

Effects of the present invention are not limited to that described above, and other effects which have not been described above will be clearly understood by those of ordinary skill in the art from the specification and the accompanying drawings.

The features, structures, effects, etc. described in the exemplary embodiments are included in at least one embodiment of the present invention and are not necessarily limited to one embodiment. Further, the features, structures, effects, etc. described in each embodiment can be combined or modified in other embodiments by those of ordinary skill in the art to which the embodiments belong. Accordingly, contents related to the combination and modification should be construed to be included in the scope of the present invention.

Although embodiments of the present invention have been described above, these are just examples and do not limit the present invention. The present invention can be modified and applied in various ways not illustrated above without departing from the essential features of the present invention by those of ordinary skill in the art. In other words, each element described in detail in the embodiments can be modified. Also, differences related to the modification and application should be construed as falling within the scope of the present invention, which is defined by the accompanying claims.

What is claimed is:

1. A method of recommending preceding educational content to be learned in advance by a user to solve educational content by an educational content recommendation device for acquiring the educational content and recommending the preceding educational content, wherein the educational content recommendation device comprises a memory storing computer-readable instructions and a controller configured to execute the instructions to perform the method comprising:

acquiring a language model of which training has been completed;

updating the language model by tuning the language model to acquire a target language model; and determining the preceding educational content through the target language model, wherein the acquirement of the target language model comprises:

acquiring an educational data set including first clustering data and second clustering data; and updating the language model to predict a probability that the first clustering data is a next token of the second clustering data-, wherein the determining of the preceding educational content comprises:

acquiring target educational content, acquiring an educational content database including one or more pieces of candidate educational content, calculating probabilities that the target educational content is a next token of the pieces of candidate educational content included in the educational content database through the target language model, and determining the preceding educational content among the one or more pieces of candidate educational content included in the educational content database on the basis of the calculated probabilities, wherein the educational content database includes first candidate educational content and second candidate educational content, and wherein the calculating of the probabilities that the target educational content is the next token comprises:

calculating a first probability that the target educational content is a next token of the first candidate educational content, and calculating a second probability that the target educational content is a next token of the second candidate educational content, wherein the determining of the preceding educational content further comprises:

comparing the first probability with the second probability, and selecting the candidate educational content having a larger probability value as the preceding educational content according to a result of the comparison, and wherein the tuning of the language model comprises tuning the language model by using a next-token prediction algorithm which is a natural language processing technique.

2. The method of claim 1, wherein the first clustering data or the second clustering data is manually labelled.

3. The method of claim 1, wherein the language model is a model related to at least one of bidirectional encoder representations from transformers (BERT) and generative pretrained transformer (GPT).

4. A computer-readable recording medium on which a program for performing the method of claim 1 in a computer is stored.

5. An educational content recommendation device for acquiring educational content and recommending preceding educational content to be learned in advance by a user to solve the educational content, the educational content recommendation device comprising:

a memory storing computer-readable instructions;

a transceiver configured to communicate with a user terminal; and a controller configured to execute the instructions to acquire the educational content through the transceiver and determine the preceding educational content to be learned in advance by the user to solve the educational content, wherein the controller is further configured to execute the instructions to acquire a language model of which training has been completed update the language model by tuning the language model to acquire a target language model, and determine the preceding educational content through the target language model, and wherein the controller is further configured to execute the instructions to acquire an educational data set including first clustering data and second clustering data and acquire the target language model by updating the language model to predict a probability that the first clustering data is a next token of the second clustering data-, wherein the determining of the preceding educational content comprises:
acquiring target educational content,
acquiring an educational content database including one or more pieces of candidate educational content,
calculating probabilities that the target educational content is a next token of the pieces of candidate educational content included in the educational content database through the target language model, and
determining the preceding educational content among the one or more pieces of candidate educational content included in the educational content database on the basis of the calculated probabilities, wherein the educational content database includes first candidate educational content and second candidate educational content, and wherein the calculating of the probabilities that the target educational content is the next token comprises:
calculating a first probability that the target educational content is a next token of the first candidate educational content; and
calculating a second probability that the target educational content is a next token of the second candidate educational content, wherein the determining of the preceding educational content further comprises:
comparing the first probability with the second probability, and
selecting the candidate educational content having a larger probability value as the preceding educational content according to a result of the comparison, and wherein the tuning of the language model comprises tuning the language model by using a next-token prediction algorithm which is a natural language processing technique.

6. The method of claim 1, wherein the first clustering data includes one or more of a question, a concept and a formula, and the second clustering data includes a concept or a formula to be learned in advance by the user to solve the question, the concept or the formula.

7. The method of claim 1, wherein the determining of the preceding educational content further comprises:
acquiring an image of the target educational content; and
recognizing information of the target educational content by analyzing the image of the target educational content.

8. The method of claim 1, further comprising providing the determined preceding educational content to a user terminal.

* * * * *